O. A. VOGEL.
REPEATING RIFLE.
APPLICATION FILED OCT. 28, 1913.
1,103,715.
Patented July 14, 1914.
5 SHEETS—SHEET 5.
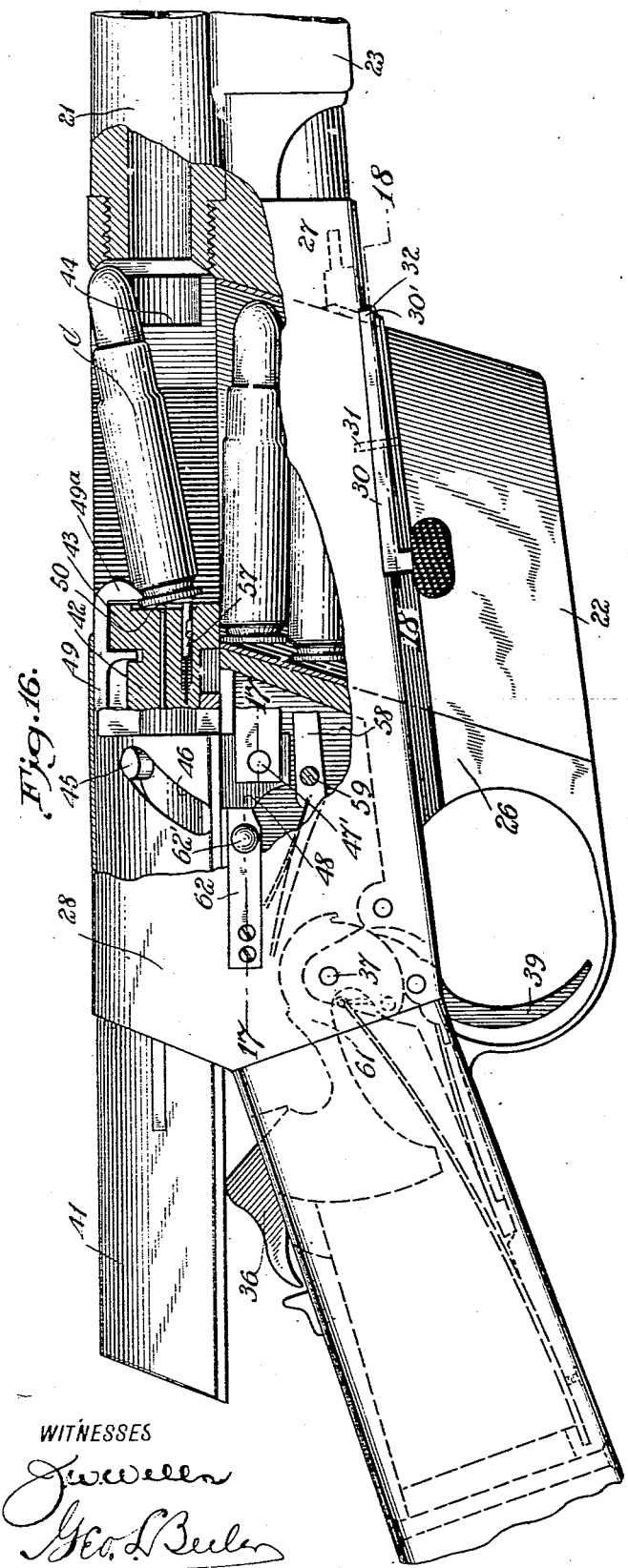
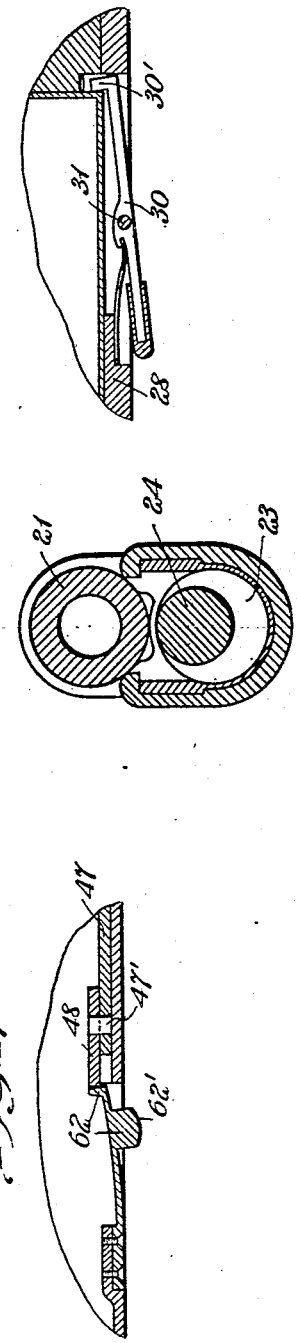
WITNESSES
INVENTOR
Orville A. Vogel
BY
ATTORNEYS

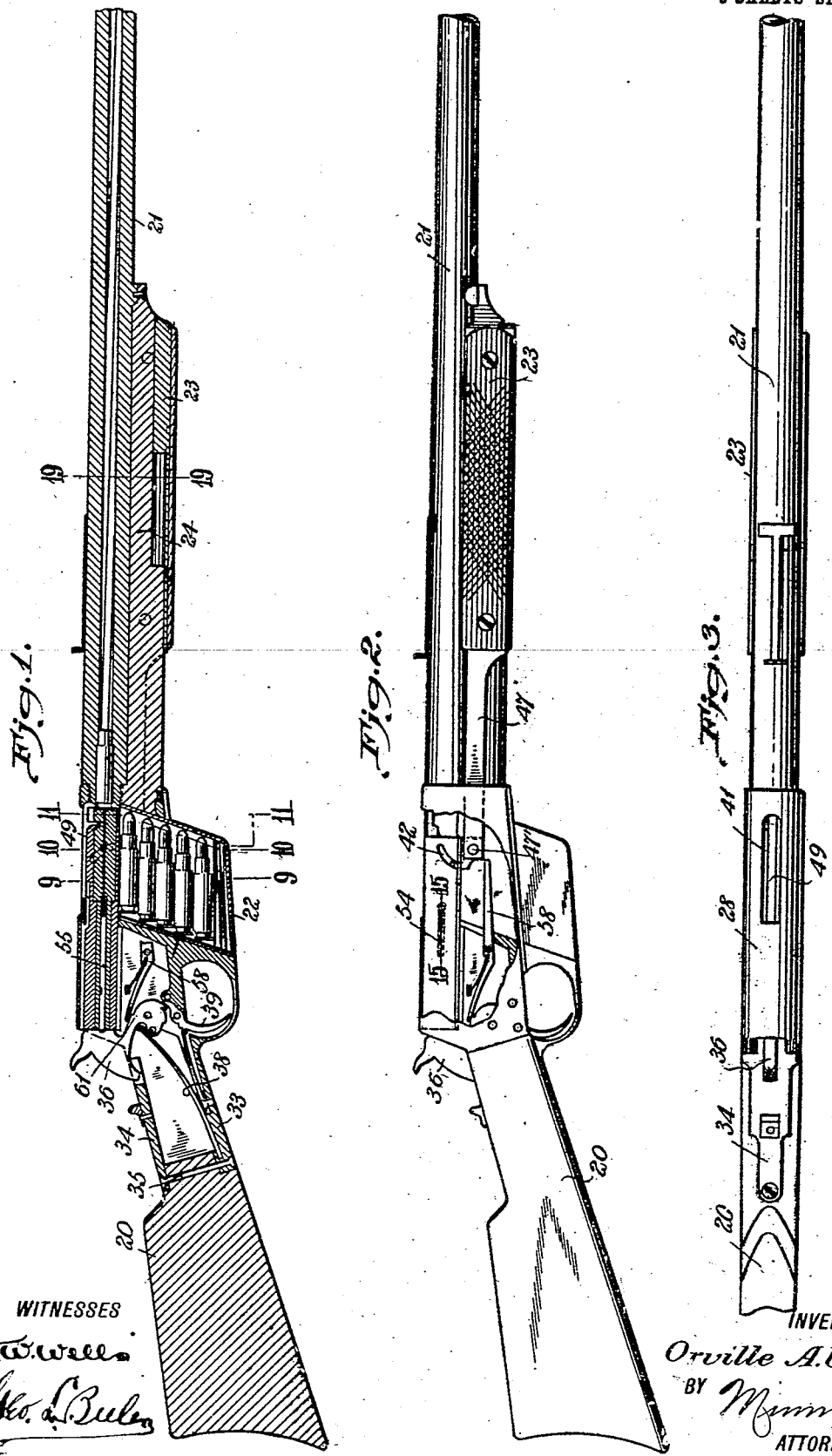

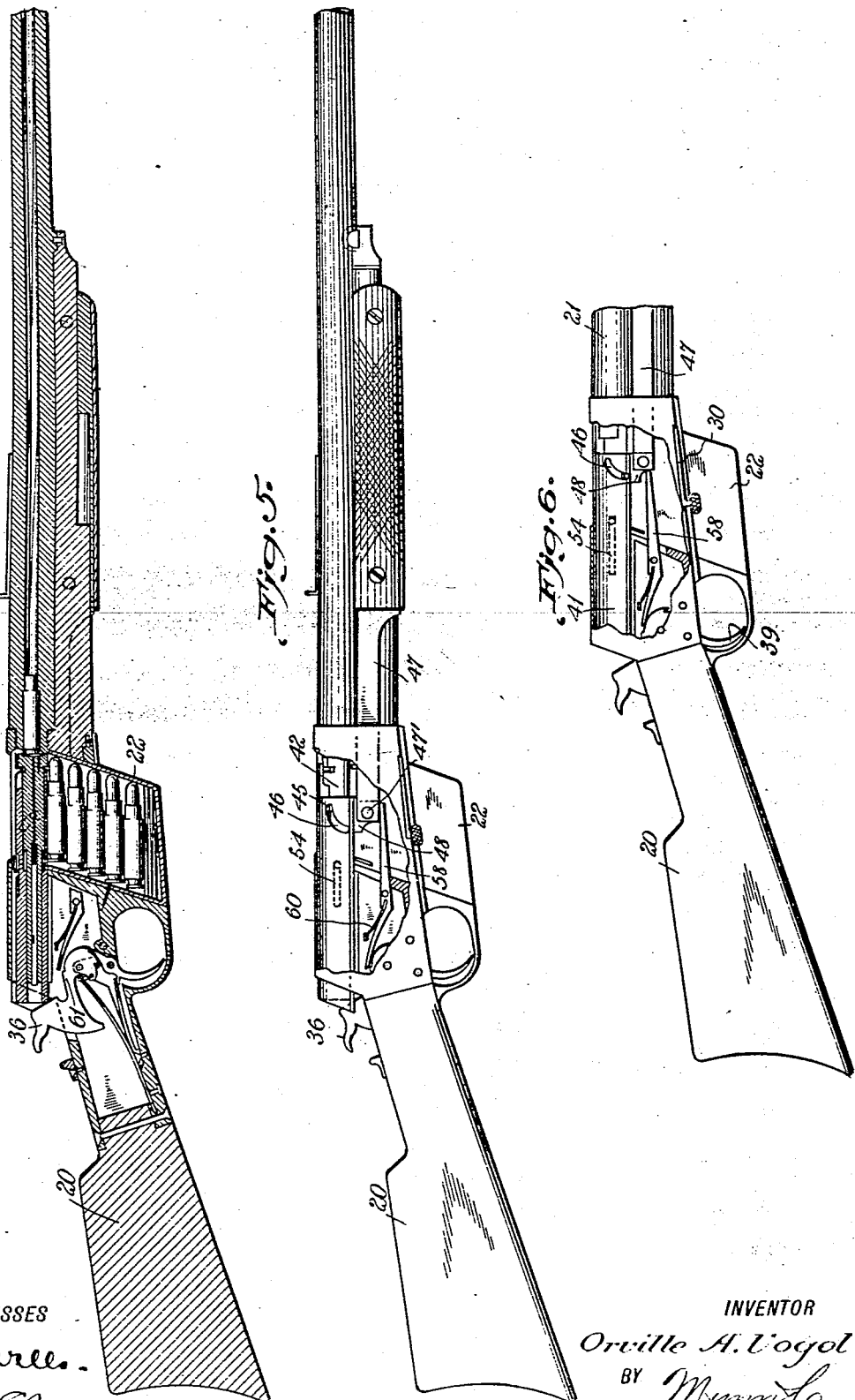

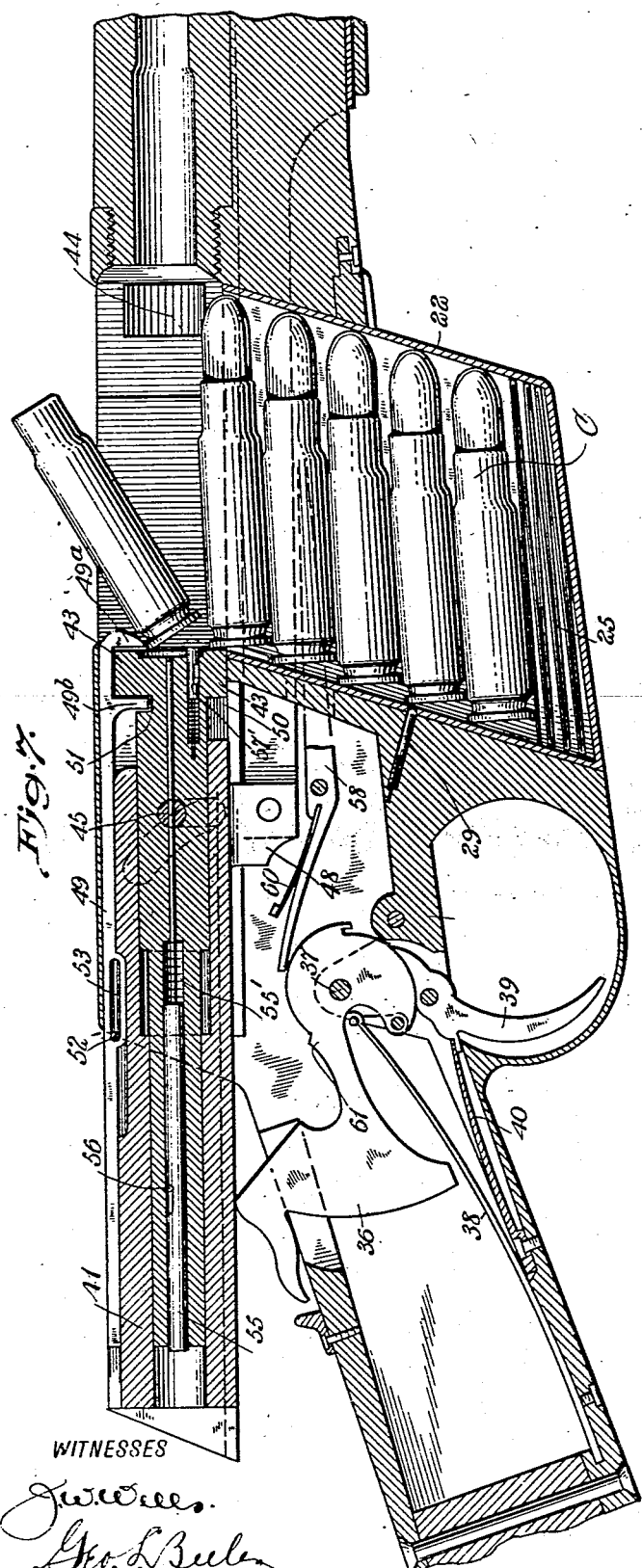
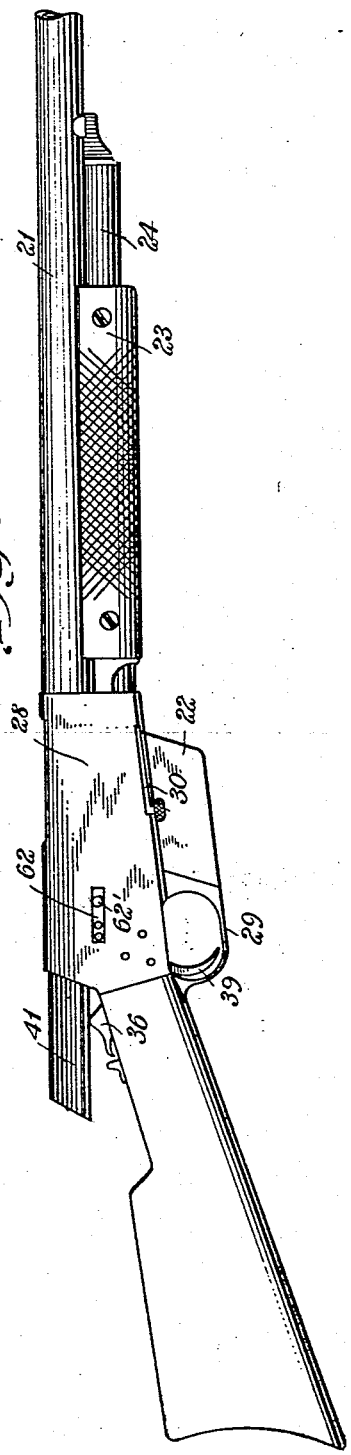

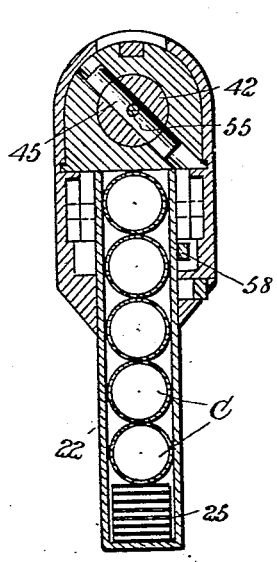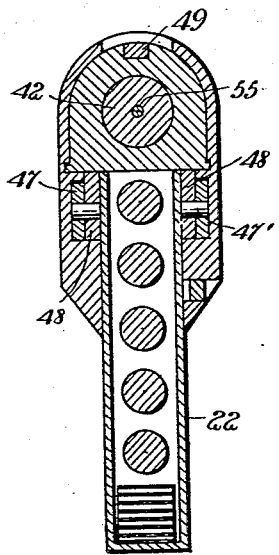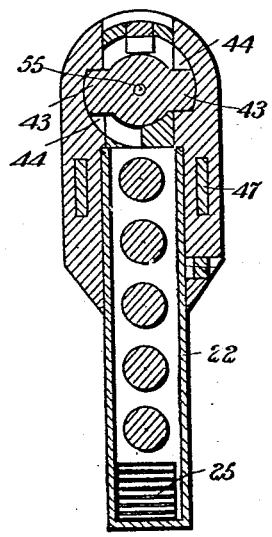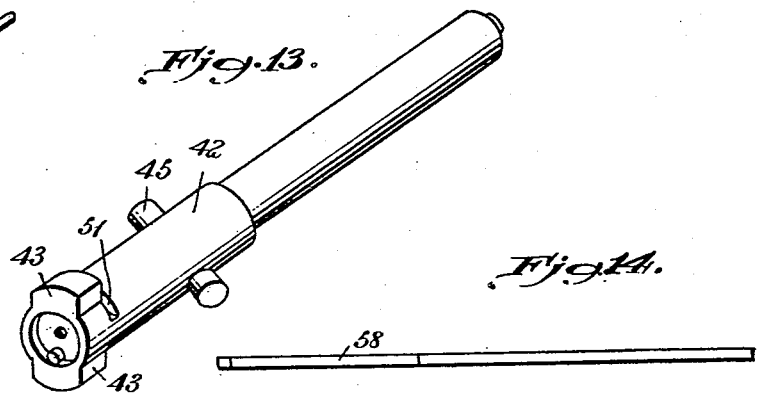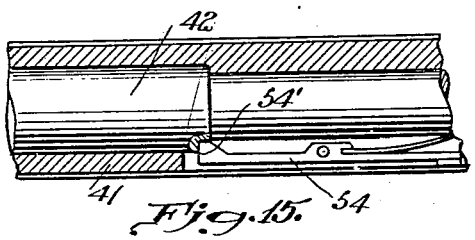

UNITED STATES PATENT OFFICE.

ORVILLE A. VOGEL, OF GALLUP, NEW MEXICO.

REPEATING RIFLE.

1,103,715.  Specification of Letters Patent.  Patented July 14, 1914.

Application filed October 28, 1913. Serial No. 797,758.

*To all whom it may concern:*

Be it known that I, ORVILLE A. VOGEL, a citizen of the United States, and a resident of Gallup, in the county of McKinley and State of New Mexico, have invented a new and Improved Repeating Rifle, of which the following is a full, clear, and exact description.

This invention relates to firearms and has particular reference to breech loading guns.

Among the objects of the invention is to generally improve the type of magazine guns so as to make them more convenient for manipulation and reliable in use than those heretofore constructed, and at the same time my purpose is to improve the appearance of the firearm.

The foregoing and other objects of the invention will hereinafter be more fully described and claimed and illustrated in the drawings forming a part of this specification in which like characters of reference indicate corresponding parts in all the views, and in which—

Figure 1 is a longitudinal section showing a preferred embodiment of the invention, the parts being in position just after the first shell has been fired; Fig. 2 is a side view of the same but with a part of the receiver casing broken away; Fig. 3 is a plan view; Fig. 4 is a view similar to Fig. 1, but showing the position of the parts when moving toward the extracting position; Fig. 5 is a view corresponding to Fig. 2 but showing the same relative positions of the parts as are shown in Fig. 4; Fig. 6 is a view indicating the action lock; Fig. 7 is a vertical longitudinal section of the breech mechanism showing the manner of extracting the shell; Fig. 8 is a side view of the gun with the parts in the position shown in Fig. 7; Figs. 9, 10 and 11 are vertical transverse sections on the lines 9—9, 10—10 and 11—11 respectively of Fig. 1; Fig. 12 is a perspective view of the ejector; Fig. 13 is a perspective view of the breech bolt; Fig. 14 is a plan view of the action lock; Fig. 15 is a plan view of the bolt catch; Fig. 16 is a view of the breech mechanism showing the relative position of the parts when holding a loaded shell; Fig. 17 is a longitudinal section indicating the forearm stop; Fig. 18 is a view corresponding to Fig. 17 and indicating the magazine lock; and Fig. 19 is a vertical transverse section on the line 19—19 of Fig. 1.

The several parts of the device may be made of any suitable materials, and the relative sizes and proportions, as well as the general design of the mechanism, may be varied to a considerable extent without departing from the spirit of the invention hereinafter more fully set forth and specifically claimed.

A gun made in accordance with this invention comprises, in addition to the usual stock 20 and barrel 21, a box magazine 22 and other parts associated therewith particularly adjacent the breech mechanism. This rifle is adapted for quick and easy repeating action by means of a reciprocating forearm 23 slidable along a track or guide 24 below the barrel 21. The magazine 22 is of the box type and is adapted to contain a number of loaded cartridges C and provided with a spring 25 in its bottom for the purpose of lifting the shells for the purpose of forcing them home to the breech. The magazine is held detachably in place between the trigger guard 26 and the front end 27 of the receiver casing 28 by means of a spring bolt catch 29 operating forwardly from the trigger guard and also by means of a lever lock 30 pivoted at 31 on the lower right hand side of the casing 28 and having a nose 30′ engaging under a lug 32 formed on the front end of the magazine. Said trigger guard is formed as an integral part of the lower tang 33 which, with the upper tang 34, is connected to the stock 20 by means of a bolt 35.

The mechanism just described provides or constitutes a housing for the lock mechanism including a hammer 36 pivoted at 37 and operated upon by a spring 38. The trigger 39 acts upon the hammer in the usual way under the force of a spring 40.

At 41 I show what I term a bolt carrier adapted to reciprocate rearwardly for the purpose of extracting an empty shell and forwardly for the purpose of driving a loaded shell home and holding it in position for firing. Said bolt carrier, as its name implies, carries a breech bolt 42 which extends longitudinally through the carrier 41 and has certain movements with the carrier and other movements independently thereof. The breech bolt has at its front end a pair of lugs 43 extending diametrically opposite from each other and in one position are adapted to interlock against a pair of shoulders 44 at the breech casing. The breech bolt is adapted to be rotated within the carrier through an angle of substantially 90 degrees for the purpose of bringing the lugs into or out of engagement with said shoulders 44. As a convenient and reliable means for effecting such rotation of the bolt I provide a pin 45 extending through and projecting beyond both sides of the bolt and into a pair of cam slots 46 arranged on opposite sides of the carrier 41. The carrier is connected to the forearm 23 by means of a pair of parallel blades 47 connected to the carrier at 47' through depending lugs 48 extending downwardly from the front end of the carrier. By this means the bolt carrier is connected directly and positively to the forearm for reciprocation thereby. The initial movement of the forearm and carrier rearwardly to the extent shown in Figs. 4 and 5 serves to cause the rotation and unlocking of the bolt 42, the cam slots 46 acting upon the pin 45 to turn the bolt around its axis independently of any longitudinal movement thereof until after the lugs 43 reach a substantially vertical position and out of engagement with the shoulders 44. The bolt then moves with the carrier by virtue of the pin 45 in engagement with the ends of the slots.

The extractor 49 is shown best in Fig. 7 and comprises a tongue-like member extending along the upper surface of the carrier 41, and having at its front end a hook $49^a$ and just in the rear thereof a finger $49^b$, said hook and finger having constant engagement with the front end of the breech bolt for the purpose of maintaining the extractor in the same longitudinal position as the bolt with respect to the carrier. The front end of the bolt is provided with a seat 50 to receive the base of the cartridge, and the hook $49^a$ is deep enough to engage with the rim of the cartridge when occupying said seat. The finger $49^b$ is adapted to project into a transverse notch 51 just in the rear of the upper lug 43 of the bolt so as to insure proper engagement between the hook $49^a$ and the cartridge rim. As shown, however, in Fig. 13, said notch 51 terminates close to the lug 43 and hence, when the bolt is turned to locking position, the finger $49^b$ rides up on the cylindrical portion of the bolt at the end of the notch and thereby lifts the hook $49^a$ out of the way of the cartridge. The extractor is held down in engagement with the carrier by means of a pin 52 extending transversely through a slot 53. The pin, therefore, prevents upward displacement of the extractor, but through the slot permits relative longitudinal movement of the carrier and extractor. Accidental or unintentional unlocking movement of the bolt is prevented by any suitable means such, for instance, as a bolt catch 54 pivoted to the carrier and having a shouldered end 54' coöperating with the bolt.

A firing pin 55 extends longitudinally through the bolt and is normally pressed rearwardly by means of a spring 55'. Such movement, however, is limited by a transverse pin 56 extending through the bolt. The front reduced end of the firing pin passes centrally through the turning pin 45 and thereby secures said turning pin in place. Coöperating with the extractor is a spring operated ejector 57 acting against the bottom of the cartridge base at the seat 50, as shown especially in Figs. 7 and 16. Said ejector is held from accidental displacement by means of a pin 57' acting in a groove $57^a$ of the ejector. The pin 57' and the groove $57^a$ permit the outer end of the ejector to be forced rearwardly by the cartridge when the bolt is locked. When the bolt is moved backwardly, however, and the hook $49^a$ is brought into engagement with the cartridge rim, said ejector springs forwardly, throwing the empty shell upwardly from the receiver, as shown in Fig. 7.

At 58 I show what I term an action lock, the same comprising a lever pivoted at 59. The front end of the lever is adapted in one position to be elevated as shown in Fig. 6 so as to be struck by one of the blades 47 or the lug 48 attached thereto. This position of the lever 58 is brought about by a spring 60 acting upon the rear end of the lever, forcing the same downwardly against the hub of the hammer when the hammer is cocked. A projection 61 formed on the upper edge of said hub, however, holds the rear end of the lever 58 elevated when the hammer is down, thereby causing the front end of the lever to be depressed as shown in Fig. 5, and permitting free movement of the forearm. The purpose of this action lock is to prevent the action of the forearm and extractor mechanism when the hammer is cocked and thereby the possible loss of a loaded cartridge.

At 62 I provide suitable means under the control of the operator to prevent sufficient rearward movement of the forearm to permit a cartridge to be received from the magazine into the receiver as shown in Figs. 16 and 17. Said stop 62 is carried by a spring and upon pressing with a thumb upon a button 62', the lug 48 will strike the stop 62 and stop the movement of the carrier and bolt at such a place as will retain all of the cartridges in the magazine. By this means I provide for the use of the firearm as a single shooter when it is desired to maintain the magazine full for emergency purposes.

Having thus described my invention, I claim as new and desire to secure by Letters Patent:

1. In a repeating rifle, the combination with a receiver, of a magazine coöperating therewith and detachably connected thereto, and means to secure the magazine in position, said means comprising a spring pressed plunger bolt 29 acting forwardly from the receiver casing into snap engagement with the rear face of the magazine and a finger operated spring pressed lever connected to the receiver casing between the ends of the magazine and having a nose engaging under a lug on the front face of the magazine.

2. In a firearm of the class set forth, the combination of a receiver casing, a bolt carrier at the upper portion thereof, means to positively move the carrier forwardly and rearwardly, a breech bolt within the carrier and moved thereby first to rotate the bolt to unlock the same and secondly to move the bolt rearwardly to open the receiver, the operating means between the carrier and bolt comprising a pin extending transversely through the bolt and coöperating with cam slots in the carrier, and a firing pin extending through said operating pin.

3. In a firearm of the class described, the combination with a receiver casing, of means to deliver cartridges thereto automatically, a breech bolt movable longitudinally and rotarily in the casing, the rotation of the bolt serving to lock or unlock the bolt with respect to the breech block of the casing, a carrier inclosing the bolt, means extending through the carrier and bolt causing the movements of the bolt with or with respect to the carrier, the initial movement of the carrier causing the unlocking rotation of the bolt and subsequent movement of the carrier causing movement of the bolt simultaneous therewith rearwardly, an extractor connected to the carrier by pin and slot connection and having downwardly projecting members coöperating with the front end of the bolt whereby the longitudinal movements of the extractor conform to the slidable movements of the bolt, one of said projecting members constituting a hook, and an ejector carried by the front end of the bolt and coöperating with said hook to deliver an empty shell from the receiver.

In testimony whereof I have signed my name to this specification in the presence of two subscribing witnesses.

ORVILLE A. VOGEL.

Witnesses:
L. N. CARY,
S. T. HAMMOCK.